United States Patent
Xu

(10) Patent No.: US 9,774,253 B2
(45) Date of Patent: Sep. 26, 2017

(54) CONTROL CIRCUIT AND ASSOCIATED METHOD FOR SWITCHING CONVERTER

(71) Applicant: Chengdu Monolithic Power Systems Co., Ltd., Chengdu (CN)

(72) Inventor: Li Xu, Chengdu (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 134 days.

(21) Appl. No.: 14/789,921

(22) Filed: Jul. 1, 2015

(65) Prior Publication Data
US 2016/0006340 A1 Jan. 7, 2016

(30) Foreign Application Priority Data
Jul. 2, 2014 (CN) .......................... 2014 1 0312922

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01)

(58) Field of Classification Search
CPC . H02M 2001/0003; H02M 2001/0006; H02M 2001/0009; H02M 2001/0035; H02M 2001/0054; H02M 1/14; H02M 3/156; H02M 3/157; H02M 3/158; H02M 3/1582; H02M 3/335; H02M 3/33507; H02M 3/33515; H02M 3/337; Y02B 70/14
See application file for complete search history.

(56) References Cited

U.S. PATENT DOCUMENTS

| 8,928,300 | B2 | 1/2015 | Xi et al. | |
| 9,401,647 | B2* | 7/2016 | Kuang | H02M 3/33507 |
| 2008/0129264 | A1* | 6/2008 | Moussaoui | H02M 3/156 323/283 |
| 2009/0322299 | A1* | 12/2009 | Michishita | H02M 3/156 323/282 |
| 2011/0062932 | A1* | 3/2011 | Hawkes | H02M 3/156 323/288 |
| 2011/0316502 | A1* | 12/2011 | Tang | H02M 3/156 323/271 |
| 2012/0153919 | A1* | 6/2012 | Garbossa | H02M 3/156 323/284 |

(Continued)

*Primary Examiner* — Emily P Pham
*Assistant Examiner* — Shahzeb K Ahmad
(74) *Attorney, Agent, or Firm* — Perkins Coie LLP

(57) ABSTRACT

A control circuit for switching converter has an ON signal generating circuit, a current sensing circuit, an OFF signal generating circuit, a logic circuit and an OFF threshold generating circuit. The ON signal generating circuit provides an ON signal based on a reference signal and a feedback signal. The current sensing circuit provides a current sensing signal based on a current flowing through a power switch of the converter. The OFF signal generating circuit provides an OFF signal based on an OFF threshold signal and the current sensing signal. The logic circuit provides a control signal based on the ON signal and the OFF signal. The OFF threshold generating circuit adjusts the OFF threshold signal based on the difference between a frequency of the switching signal and a preset frequency, so as to make the frequency of the switching signal substantially equal or larger than the preset frequency.

15 Claims, 7 Drawing Sheets

(56) References Cited

U.S. PATENT DOCUMENTS

2013/0308349 A1* 11/2013 Yu ..................... H02M 3/33515
363/21.15
2014/0253079 A1* 9/2014 Ding ..................... H02M 3/156
323/283

* cited by examiner

US 9,774,253 B2

CONTROL CIRCUIT AND ASSOCIATED METHOD FOR SWITCHING CONVERTER

CROSS-REFERENCE TO RELATED APPLICATION(S)

This application claims priority to and the benefit of Chinese Patent Application No. 201410312922.6, filed on Jul. 2, 2014, which is incorporated herein by reference in its entirety.

TECHNICAL FIELD

The present invention generally relates to electronic apparatuses, and more particularly but not exclusively to control circuits for switching mode power supply.

BACKGROUND

Switching converters are widely used due to their high efficiency and simple internal structure. Many control modes could be used to control switching converters, such as constant on time (COT) control mode, peak current control mode, and average current control mode. Among these control modes, COT control mode is getting more and more popular per its fast transient response, simple structure and smooth switch of operation mode. But, for a switching converter with COT control mode, the switching frequency is easily affected by the change of load, input voltage or output voltage. Variation of the switching frequency will cause EMI (electromagnetic interference), EMC (electromagnetic compatibility), noise and other problems. Designing control circuit for switching converter, especially for switching converter with COT control mode, becomes a big challenge.

SUMMARY

Embodiments of the present invention are directed to a control circuit for a switching converter with at least a power switch, comprising: an ON signal generating circuit having a first input terminal, a second input terminal and an output terminal, wherein the first input terminal is configured to receive a reference signal, and wherein the second input terminal is configured to receive a feedback signal indicating an output voltage or a load current of the switching converter, and wherein based on a comparison result between the reference signal and the feedback signal, the ON signal generating circuit provides an ON signal at the output terminal; a current sensing circuit having an input terminal and an output terminal, wherein based on a current flowing through the power switch, the current sensing circuit provides a current sensing signal; an OFF signal generating circuit having a first input terminal, a second input terminal and an output terminal, wherein the first input terminal is configured to receive an OFF threshold signal, and wherein the second input terminal is configured to receive the current sensing signal, and wherein based on a comparison result between the OFF threshold signal and the current sensing signal, the OFF signal generating circuit provides an OFF signal at the output terminal; a logic circuit having a first input terminal, a second input terminal and an output terminal, wherein the first input terminal is configured to receive the ON signal, and wherein the second input terminal is configured to receive the OFF signal, and wherein based on the ON signal and the OFF signal, the logic circuit provides a switching signal at the output terminal, and wherein the switching signal is configured to control the power switch; and an OFF threshold generating circuit having an input terminal and an output terminal, wherein the input terminal is configured to receive the switching signal, and wherein the output terminal is configured to provide the OFF threshold signal, and wherein the OFF threshold generating circuit adjusts the OFF threshold signal based on a difference between a frequency of the switching signal and a preset frequency, so as to make the frequency of the switching signal substantially equal or larger than the preset frequency.

Furthermore, there has been provided, in accordance with an embodiment of the present invention, a control method for a switching converter with at least a power switch, comprising: generating an ON signal based on a comparison result between a reference signal and a feedback signal, wherein the feedback signal indicates an output voltage or a load current of the switching converter; generating a current sensing signal based on a current flowing through the power switch; generating an OFF signal based on a comparison result between a OFF threshold signal and the current sensing signal; generating a switching signal based on the ON signal and the OFF signal, wherein the switching signal is configured to control the power switch; and adjusting the OFF threshold signal based on a difference between a frequency of the switching signal and a preset frequency, so as to make the frequency of the switching signal substantially equal or larger than the preset frequency.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
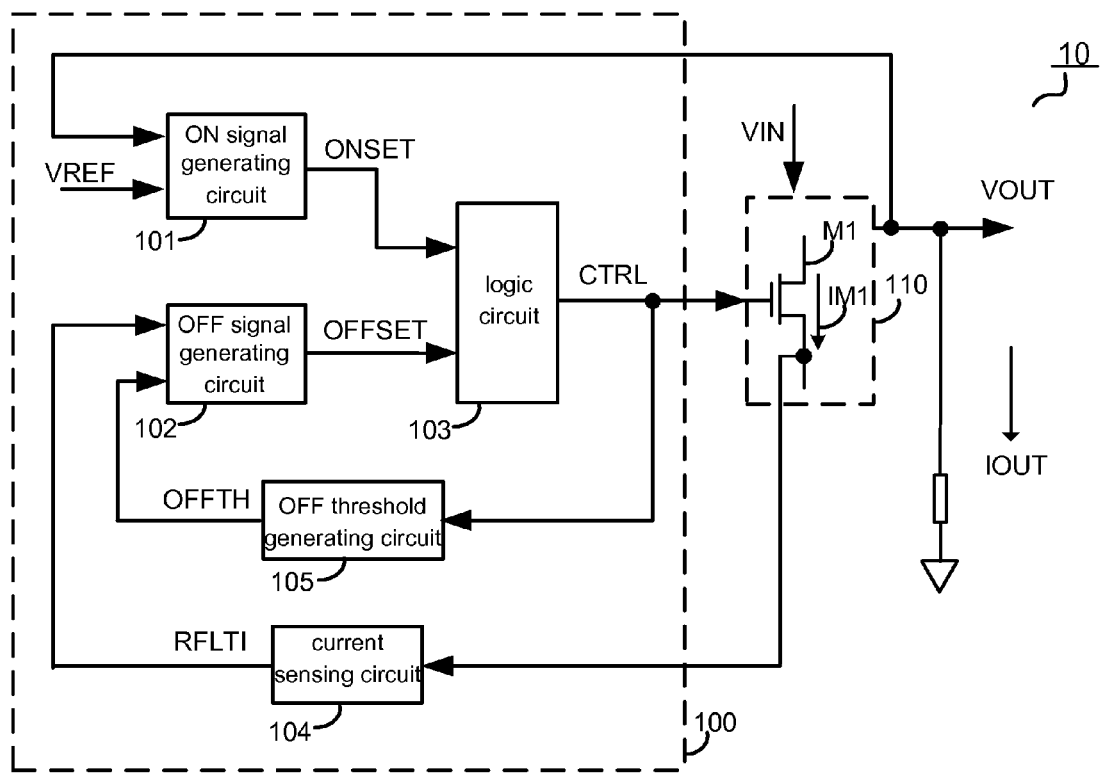
FIG. 1 schematically illustrates a switching converter 10 in accordance with an embodiment of the present invention.

FIG. 1 schematically illustrates a switching converter 10 in accordance with an embodiment of the present invention. The switching converter 10 comprises a control circuit 100 and a switching circuit 110.

The switching circuit 110 comprises at least a power switch M1. The power switch M1 has a first terminal, a second terminal and a control terminal. The switching circuit 110 converts an input voltage VIN to an output voltage VOUT under the control of a control signal CTRL. The switching circuit 110 may apply many topologies, such as buck converter, boost converter, buck-boost converter, flyback converter, and other switching converters that may adopt COT control.

The control circuit 100 comprises an ON signal generating circuit 101, an OFF signal generating circuit 102, a logic circuit 103, a current sensing circuit 104 and an OFF threshold generating circuit 105.

The ON signal generating circuit 101 has a first input terminal, a second input terminal and an output terminal. Based on a comparison result between a reference signal VREF received at the first input terminal and the output voltage VOUT received at the second input terminal, the ON signal generating circuit 101 provides an ON signal ONSET at the output terminal. In another embodiment, the ON signal generating circuit 101 provides the ON signal ONSET based on a comparison result between the reference signal VREF and a feedback signal indicating a load current IOUT of the switching converter 10.

The OFF signal generating circuit 102 has a first input terminal, a second input terminal and an output terminal. The OFF signal generating circuit 102 provides an OFF signal OFFSET at the output terminal based on a comparison result between an OFF threshold signal OFFTH received at the first input terminal and a current sensing signal RFLTI received at the second input terminal.

The logic circuit 103 has a first input terminal, a second input terminal and an output terminal. The logic circuit 103 provides a switching signal CTRL at the output terminal based on the ON signal ONSET received at the first input terminal and the OFF signal OFFSET received at the second input terminal.

The current sensing circuit 104 has an input terminal and an output terminal. The current sensing circuit 104 provides the current sensing signal RFLTI based on the current flowing through the power switch M1. In one embodiment, the current sensing circuit 104 is configured to detect the current flowing through the power switch M1 directly. In another embodiment, the current sensing circuit 104 comprises a current simulating circuit configured to simulate the current flowing through the power switch M1 by detecting the voltage on the second terminal of the power switch M1 or the voltage difference between the first terminal and the second terminal of the power switch M1.

Figure 2:
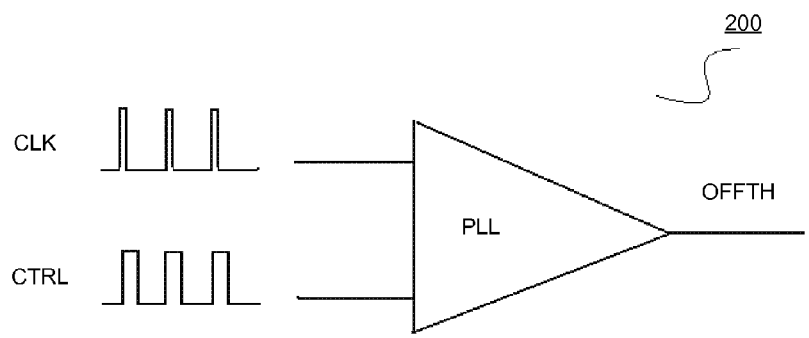
FIG. 2 schematically illustrates an OFF threshold generating circuit 200 in accordance with an embodiment of the present invention.

The OFF threshold generating circuit 105 has an input terminal and an output terminal. The OFF threshold generating circuit 105 provides the OFF threshold signal OFFTH based on the difference between a frequency of the switching signal CTRL and a preset frequency FQREF, so as to make the frequency of the switching signal CTRL substantially equal to the preset frequency FQREF. FIG. 2 schematically illustrates an OFF threshold generating circuit 200 in accordance with an embodiment of the present invention. The OFF threshold generating circuit 200 comprises a phase lock (PLL) circuit. The PLL circuit is configured to receive a reference clock signal CLK and the switching signal CTRL, and provides the OFF threshold signal OFFTH based on the frequency difference between the reference clock signal CLK and the switching signal CTRL.

Figure 3:
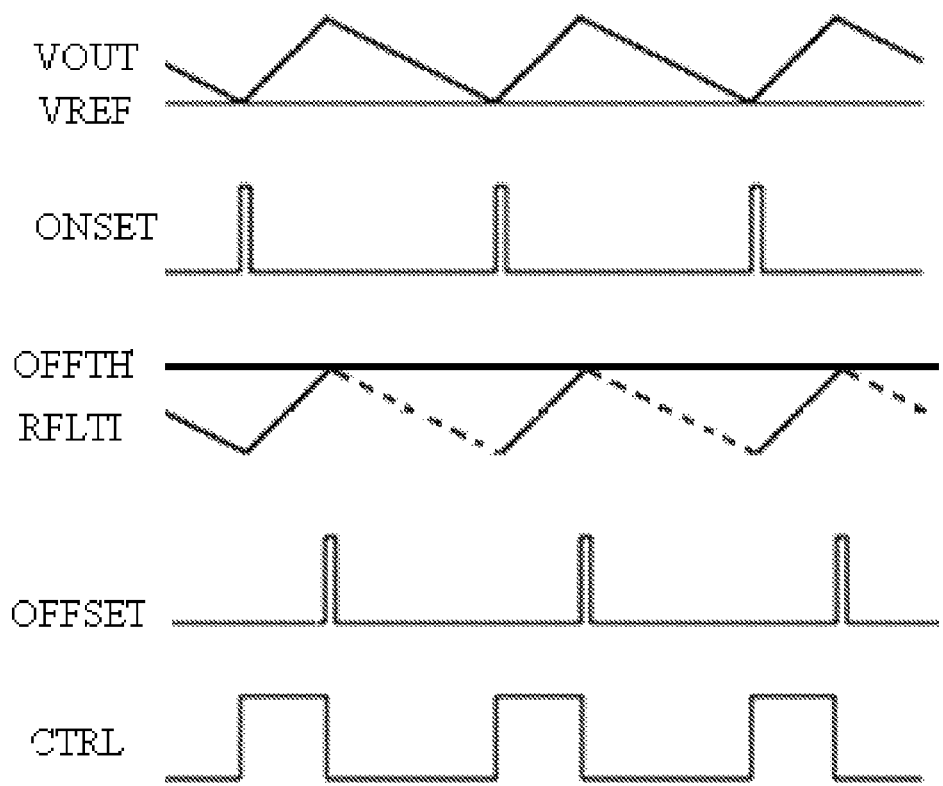
FIG. 3 illustrates operational waveforms of the switching converter 10 in accordance with an embodiment of the present invention.

FIG. 3 illustrates operational waveforms of the switching converter 10 in accordance with an embodiment of the present invention. When the output voltage VOUT becomes smaller than the reference signal VREF, the ON signal ONSET jumps from logic low to logic high, the switching signal CTRL is turned to logical high to turn on the power switch M1. The current sensing signal RFLTI and the current flowing through the power switch M1 (IM1) are increased since the power switch M1 is turned on. When the current sensing signal RFLTI reaches the OFF threshold OFFTH provided by the OFF threshold generating circuit 105, the switching signal CTRL is turned to logical low, and the power switch M1 is turned off. The OFF threshold generating circuit 105 adjusts the OFF threshold signal OFFTH based on the difference between a frequency of the switching signal CTRL and a preset frequency FQREF, so as to make the frequency of the switching signal CTRL substantially equal to the preset frequency FQREF. In one embodiment, when the power switch M1 is tuned off, the current sensing signal RFLTI could fall slowly as dashed line in FIG. 3. In another embodiment, when the power switch M1 is tuned off, the current sensing signal RFLTI could fall to a low value sharply.

Figure 4:
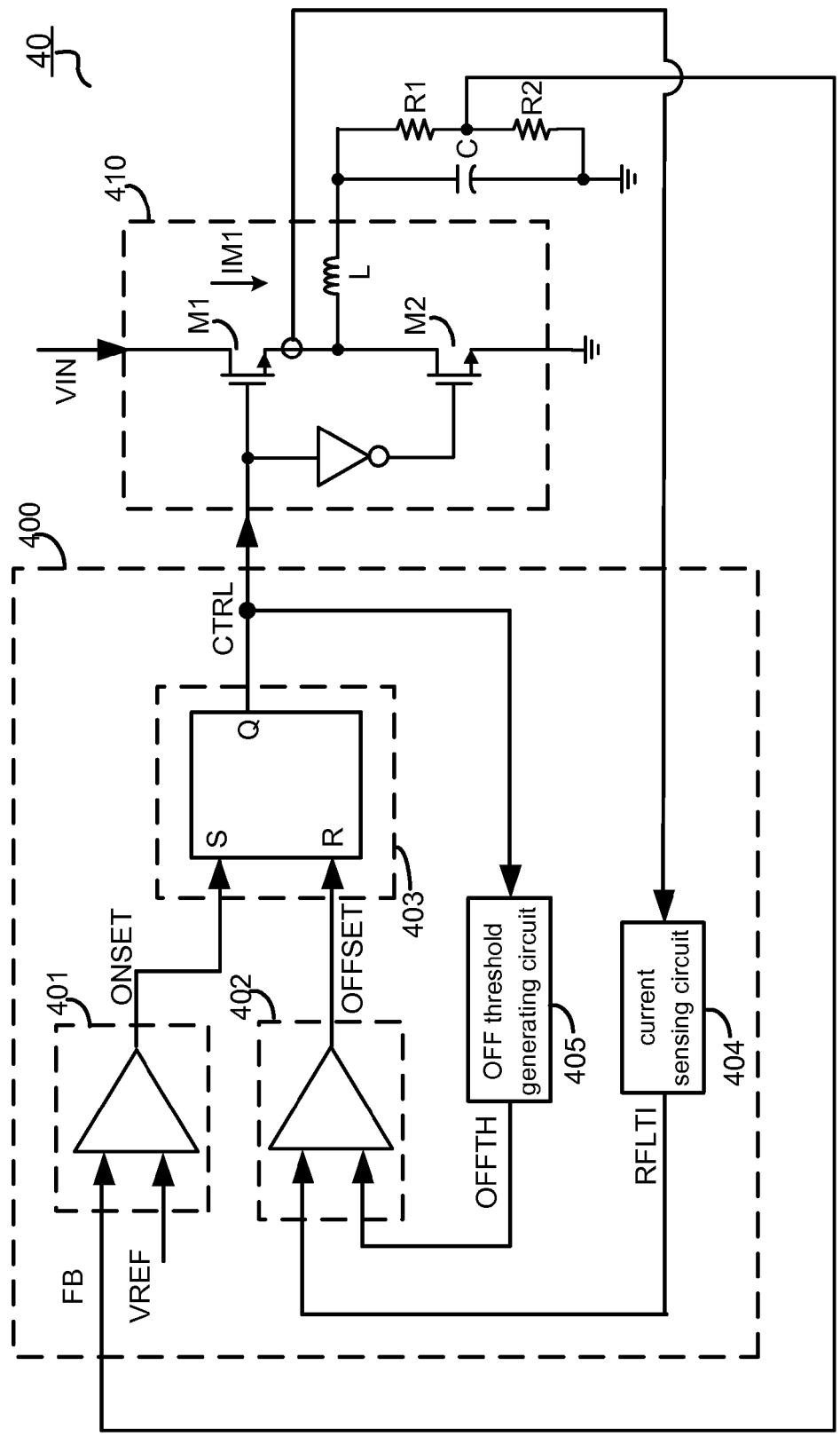
FIG. 4 schematically illustrates a switching converter 40 in accordance with an embodiment of the present invention.

FIG. 4 schematically illustrates a switching mode power converter 40 in accordance with an embodiment of the present invention. The switching mode power converter 40 comprises a control circuit 400 and a switching circuit 410. The switching circuit 410 adopts a synchronous buck topology, comprising a power switch M1, a low side switch M2, an inductor L and an output capacitor C. The power switch M1 has a first terminal configured to receive an input voltage VIN, a control terminal configured to receive the switching signal CTRL, and a second terminal. The low side switch has a first terminal coupled to the second terminal of the power switch M1, a control terminal and a second terminal connected to ground. The inductor L has a first terminal connected to the second terminal of the power switch M1 and a second terminal configured to provide the output voltage VOUT. The switching circuit 410 converts the input voltage VIN to the output voltage VOUT under the control of a control signal CTRL.

The control circuit 400 comprises an ON signal generating circuit 401, an OFF signal generating circuit 402, a logic circuit 403, a current sensing circuit 404 and an OFF threshold generating circuit 405.

The ON signal generating circuit 401 comprises a first comparator COM1. The first comparator COM1 has a first input terminal utilized as the first input terminal of the ON signal generating circuit 401, a second input terminal utilized as the second input terminal of the ON signal generating circuit 401 and an output terminal utilized as the output terminal of the ON signal generating circuit. Based on a comparison result between the reference signal VREF received at the first input terminal and the feedback voltage VFB received at the second input terminal, the ON signal generating circuit 401 provides the ON signal ONSET on the output terminal. In the embodiment shown in FIG. 3, a first resister RF1 and a second resister RF2 are connected in series to sense the output voltage VOUT and provide the feedback voltage VFB. In another embodiment, the feedback voltage VFB may indicate the load current of the switching converter 40.

The OFF signal generating circuit 402 comprises a second comparator COM2. The second comparator COM2 has a first input terminal, a second input terminal and an output terminal. The second comparator COM2 provides the OFF signal OFFSET at the output terminal based on a comparison result between an OFF threshold signal OFFTH received at the first input terminal and a current sensing signal RFLTI received at the second input terminal.

The logic circuit 403 comprises a RS flip-flop RS1. The RS flip-flop RS1 has a first input terminal R, a second input terminal S and an output terminal O. The logic circuit 103 provides a switching signal CTRL at the output terminal O based on the ON signal ONSET received at the first input terminal R and the OFF signal OFFSET received at the second input terminal S.

The current sensing circuit 404 has an input terminal and an output terminal. The current sensing circuit 104 provides the current sensing signal RFLTI based on the current flowing through the power switch M1.

The OFF threshold generating circuit 405 has an input terminal and an output terminal. The OFF threshold generating circuit 105 adjusts the OFF threshold signal OFFTH based on the difference between the frequency of the switching signal CTRL and the preset frequency FQREF, so as to make the frequency of the switching signal CTRL substantially equal to the preset frequency FQREF.

Figure 5:
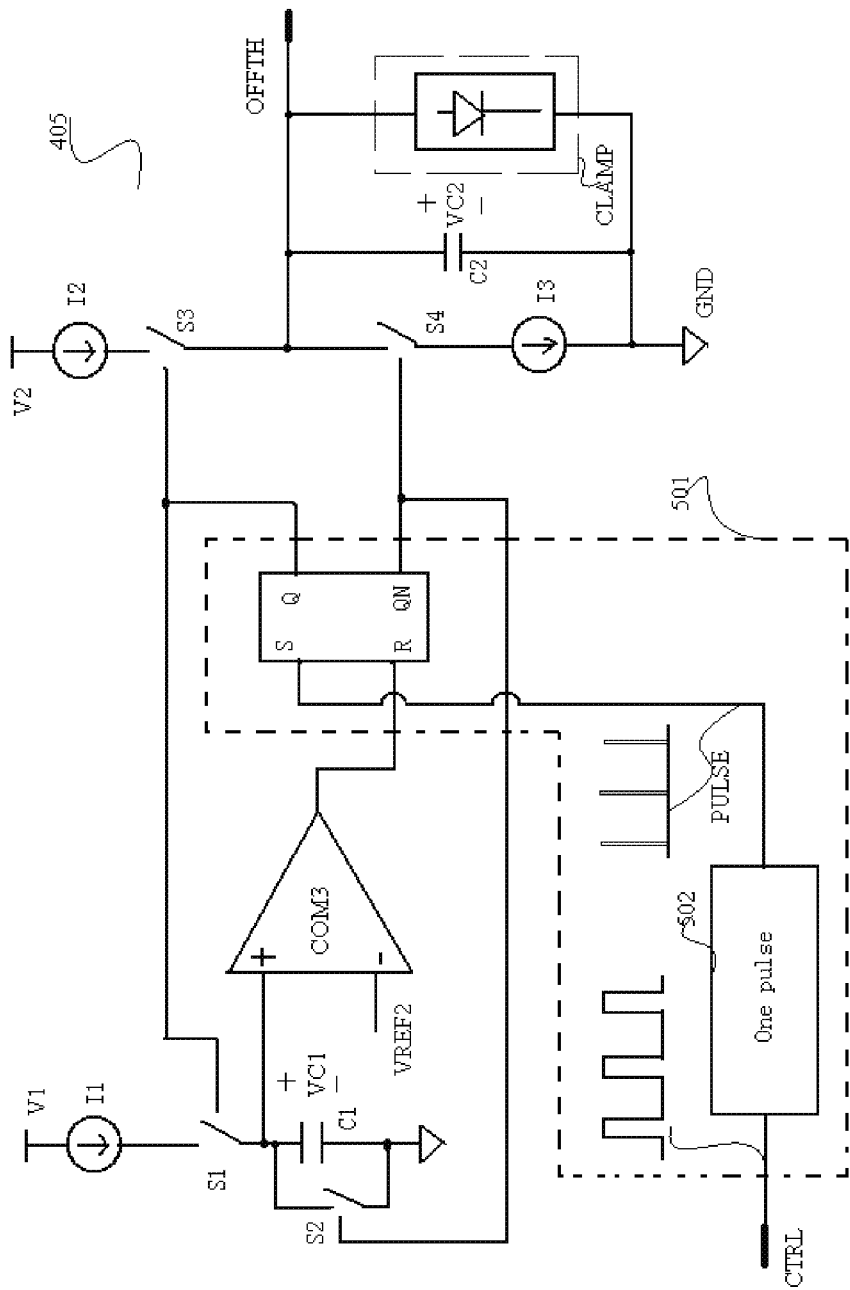
FIG. 5 schematically illustrates an OFF threshold generating circuit 405 in accordance with an embodiment of the present invention.

FIG. 5 schematically illustrates an OFF threshold generating circuit 405 in accordance with an embodiment of the present invention. The OFF threshold generating circuit 405 comprises a first current source I1, a second current source I2, a third current source I3, a first capacitor C1, a second capacitor C2, a first switch S1, a second switch S2, a third switch S3, a fourth switch S4, a third comparator COM3 and a second logic circuit 501.

The first capacitor C1 has a first terminal and a second terminal, wherein the second terminal is connected to ground. The first switch S1 has a first terminal, a second terminal and a control terminal, wherein the first terminal is coupled to a first voltage V1 via the first current source I1, and wherein the second terminal is coupled to the first terminal of the first capacitor C1. The second switch S2 has a first terminal, a second terminal and a control terminal, wherein the first terminal is coupled to the first terminal of the first capacitor C1, and wherein the second terminal is connected to ground. The second capacitor C2 has a first terminal and a second terminal, wherein the second terminal is connected to ground. The third switch S3 has a first terminal, a second terminal and a control terminal, wherein the first terminal receives a second voltage V2 via the second current source I2, and wherein the second terminal is coupled to the first terminal of the second capacitor C2. The fourth switch S4 has a first terminal, a second terminal and a control terminal, wherein the first terminal is coupled to the first terminal of the first capacitor C1, and wherein the second terminal is coupled to ground via third current source I3. The third comparator COM3 has a first input terminal, a second input terminal and an output terminal, and wherein the first input terminal is coupled to the first terminal of the first capacitor C1, and wherein the second input terminal is configured to receive a second reference signal VREF2. The second logic circuit 501 has a first input terminal, a second input terminal, a first output terminal and a second output terminal, wherein the first input terminal is coupled to the output of the third comparator COM3, and wherein the second input terminal is configured to receive the switching signal CTRL, and wherein the second logic circuit is configured to provide a plurality of control signals to control the first switch S1, the second switch S2, the third switch S3 and the fourth switch S4.

Figure 6:
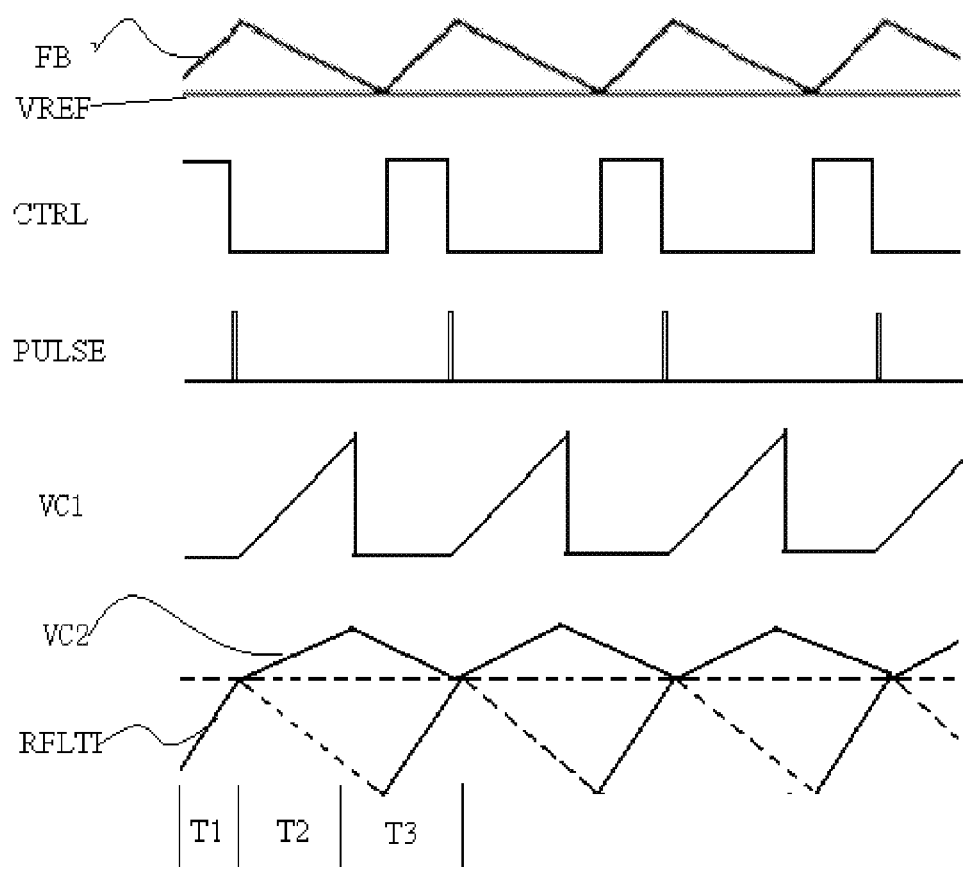
FIG. 6 illustrates operational waveforms of the switching mode power converter 40 in steady status in accordance with an embodiment of the present invention.

FIG. 6 illustrates operational waveforms of the switching converter 40 in accordance with an embodiment of the present invention. When the feedback signal VFB becomes smaller than the reference signal VREF, the ON signal ONSET rises from logic low to logic high, and the switching signal CTRL rises to logical high to turn on the power switch M1.

During the period T1, the current sensing signal RFLTI and the current flowing through the power switch M1 (IM1) are increased since the power switch M1 is turned on. When the current sensing signal RFLTI reaches the OFF threshold OFFTH provided by the OFF threshold generating circuit 405, the switching signal CTRL falls to logical low to turn off the power switch M1. The falling edge of the switching signal CTRL would reset the second logic circuit 501, A logic high signal is generated on the first output terminal Q of the second logic circuit 501 to turn on the first switch S1 and the third switch S3, A logic low signal is generated on the second output terminal QN of the second logic circuit 501 to turn off the second switch S2 and the fourth switch S4.

During the period T2, the voltage across the first capacitor C1 (VC1) and the voltage across the second capacitor C2 (VC2) increase slowly after the first switch S1 and the third switch S3 turned on. When the VC1 becomes larger than the second reference signal VREF2, the output signal of the third comparator COM3 would rise logic high to set the logic circuit 501, and a logic low signal is generated on the first output terminal Q of the second logic circuit 501 to turn off the first switch S1 and the third switch S3, and a logic high signal is generated on the second output terminal QN of the second logic circuit 501 to turn on the second switch S2 and the fourth switch S4.

During the period T3, when the second switch S2 and the fourth switch S4 are turned on, the VC1 would decrease to zero sharply, and the VC2 would decrease slowly since the second capacitor would be discharged through the fourth switch S4 and the third current source I3.

During the period T2 and T3, the output voltage VOUT would decrease since the power switch M1 is turned off. When the feedback voltage VFB becomes smaller than the reference signal VREF, the ON signal ONSET rises from logic low to logic high, and the switching signal CTRL rises to logical high to turn on the power switch M1. The current sensing signal RFLTI and the current flowing through the power switch M1 (IM1) are increased since the power switch M1 is turned on. At the end of T3, the current sensing signal RFLTI increases while the OFF threshold OFFTH provided by the OFF threshold generating circuit 405 decreases. When the current sensing signal RFLTI reaches the OFF threshold OFFTH, the switching signal CTRL falls to logical low, and the power switch M1 is turned off.

As the above described processes are repeated, the output voltage VOUT could be regulated around a preset value.

In some embodiments, the OFF threshold generating circuit 405 further comprises a clamping circuit CLAMP. The clamping circuit CLAMP is configured to set a maximum value of the VC2 to a clamped voltage VCLAP.

Figure 7:
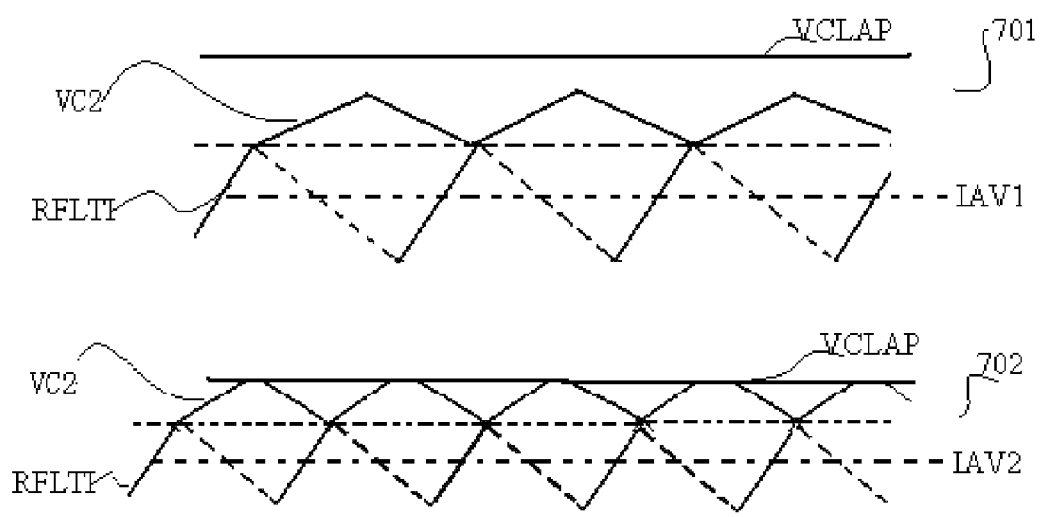
FIG. 7 illustrates operational waveforms of the switching mode power converter 40 under different loads in accordance with an embodiment of the present invention.

FIG. 7 illustrates operational waveforms of the switching mode power converter 40 under different loads in accordance with an embodiment of the present invention. When the converter 40 is under light load, as shown in 701, the maximum voltage of VC2 is lower than the clamped voltage VCLAP. Once load current IOUT increases, the current sensing signal RFLT2 and VC2 increases concomitantly. The maximum voltage of VC2 is increased to the clamped voltage VCLAP as the load current IOUT increases. When the maximum voltage of VC2 is clamped to the clamped voltage VCLAP by the clamping circuit CLAMP, the average current IAV1 of the power switch M1 is also clamped if the input voltage VIN, the output voltage VOUT, and the inductor L are constant, and as a result the convert 40 cannot provide enough current to load.

To provide enough current for load, the switching circuit 40 needs to increase the switching frequency. As shown in 702, the average current is increased to IAV2 when the switching frequency is increased, and current provided to load is also increased. When the load current is decreased, the switching converter 40 would decrease its switching frequency to the preset frequency FQREF, configured to prevent the switching frequency dropping into audio frequency.

Similarly, the clamped circuit VCLAM could be coupled to the output terminal of the PLL circuit shown in FIG. 2.

Figure 8:
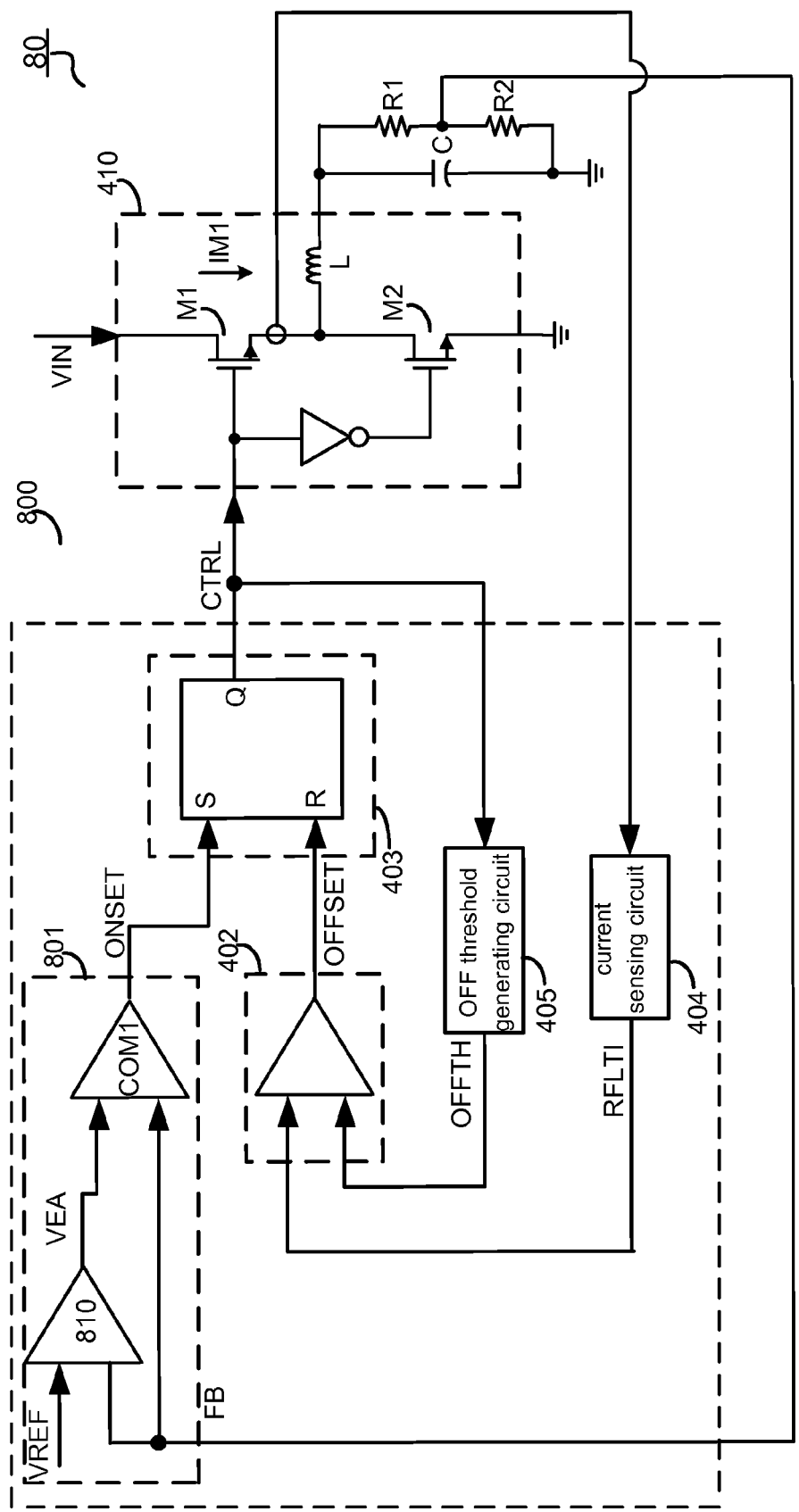
FIG. 8 schematically illustrates a switching converter 80 in accordance with an embodiment of the present invention.

FIG. 8 schematically illustrates a switching mode power converter 80 in accordance with an embodiment of the present invention. The switching mode power converter 80 comprises a control circuit 800 and a switching circuit 410. In the control circuit 800, an ON signal generating circuit 801 is applied to replace the ON signal generating circuit 401 in the control circuit 400. The ON signal generating circuit 801 comprises a first amplifier 810 and the first comparator COM1. The first amplifier 810 has a first input terminal, a second input terminal and an output terminal, wherein the first input terminal is utilized as the first input terminal of the ON signal generating circuit 801 for receiving the reference signal VREF, and wherein the second input terminal is utilized as the second input terminal of the ON signal generating circuit 801 for receiving the feedback signal VFB, and further wherein the output terminal is configured to provide an amplified error signal VEA. The first comparator COM1 has a first input terminal, a second input terminal and an output terminal, wherein the first input terminal of the first comparator COM1 is coupled to the output terminal of the first amplifier 810, and wherein the second input terminal of the first comparator COM1 is coupled to the second input terminal of the first amplifier 810, and further wherein the output terminal of the first comparator COM1 is utilized as the output terminal of the ON signal generating circuit. The first amplifier 810 could greatly improve the performance of load regulation and line regulation of the converter 80.

Control circuits for switching converter have been disclosed. While specific embodiments of the present invention have been provided in the above description, it should be understood that these embodiments are for illustration purposes and not intend to limit the present invention. Many additional embodiments will be apparent to persons of ordinary skill in the art under the spirit of the present invention

I claim:

1. A control circuit for a switching converter with at least a power switch, the control circuit comprising:
   an ON signal generating circuit having a first input terminal, a second input terminal and an output terminal, wherein the first input terminal is configured to receive a reference signal, and wherein the second input terminal is configured to receive a feedback signal indicating an output voltage or a load current of the switching converter, and wherein based on a comparison result between the reference signal and the feedback signal, the ON signal generating circuit provides an ON signal at the output terminal, wherein the ON signal generating circuit comprises a first amplifier having a first input terminal, a second input terminal and an output terminal, and wherein the first input terminal is utilized as the first input terminal of the ON signal generating circuit, and wherein the second input terminal is utilized as the second input terminal of the ON signal generating circuit, and wherein the ON signal generating circuit further comprises a first comparator having a first input terminal, a second input terminal and an output terminal, and wherein the first input terminal is coupled to the output terminal of the first amplifier, and wherein the second input terminal is coupled to the second input terminal of the first amplifier, and wherein the output terminal is utilized as the output terminal of the ON signal generating circuit;
   a current sensing circuit having an input terminal and an output terminal, wherein based on a current flowing through the power switch, the current sensing circuit provides a current sensing signal;
   an OFF signal generating circuit having a first input terminal, a second input terminal and an output terminal, wherein the first input terminal is configured to receive an OFF threshold signal, and wherein the second input terminal is configured to receive the current sensing signal, and wherein based on a comparison result between the OFF threshold signal and the current sensing signal, the OFF signal generating circuit provides an OFF signal at the output terminal;
   a logic circuit having a first input terminal, a second input terminal and an output terminal, wherein the first input terminal is configured to receive the ON signal, and wherein the second input terminal is configured to receive the OFF signal, and wherein based on the ON signal and the OFF signal, the logic circuit provides a switching signal at the output terminal, and wherein the switching signal is configured to control the power switch; and
   an OFF threshold generating circuit having an input terminal and an output terminal, wherein the input terminal is configured to receive the switching signal, and wherein the output terminal is configured to provide the OFF threshold signal, and wherein the OFF threshold generating circuit adjusts the OFF threshold signal based on a difference between a frequency of the switching signal and a preset frequency, so as to make the frequency of the switching signal substantially equal or larger than the preset frequency; wherein
   the OFF threshold generating circuit further comprises a clamping circuit configured to set a maximum value for the OFF threshold signal.

2. The control circuit according to claim 1, wherein the switching converter is configured in a BUCK converter.

3. The control circuit according to claim 2, wherein the power switch has a first terminal, a control terminal and a second terminal, and wherein the first terminal is configured to receive an input voltage, and wherein the control terminal is configured to receive the switching signal, and wherein the switching converter further comprises:
   a low side switch having a first terminal, a control terminal and a second terminal, wherein the first terminal is coupled to the second terminal of the power switch, and wherein the second terminal is connected to ground; and
   an inductor having a first terminal and a second terminal, wherein the first terminal is coupled to the second terminal of the power switch, and wherein the second terminal is configured to provide the output voltage.

4. The control circuit according to claim 1, wherein the ON signal generating circuit comprises a first comparator having a first input terminal, a second input terminal and an output terminal, and wherein the first input terminal is utilized as the first input terminal of the ON signal generating circuit, and wherein the second input terminal is utilized as the second input terminal of the ON signal generating circuit, and wherein the output terminal is utilized as the output terminal of the ON signal generating circuit.

5. The control circuit according to claim 1, wherein the OFF threshold generating circuit comprises a PLL circuit, wherein the PLL circuit is configured to receive a reference clock signal and the switching signal, and wherein the PLL circuit provides the OFF threshold signal based on a frequency difference between the reference clock signal and the switching signal.

6. The control circuit according to claim 1, wherein the OFF threshold generating circuit comprises:
   a first capacitor having a first terminal and a second terminal, wherein the second terminal is connected to ground;
   a first current source;
   a first switch having a first terminal, a second terminal and a control terminal, wherein the first terminal receives a first voltage via the first current source, and wherein the second terminal is coupled to the first terminal of the first capacitor;
   a second switch having a first terminal, a second terminal and a control terminal, wherein the first terminal is coupled to the first terminal of the first capacitor, and wherein the second terminal is connected to ground;
   a second capacitor having a first terminal and a second terminal, wherein the second terminal is connected to ground;
   a second current source;
   a third switch having a first terminal, a second terminal and a control terminal, wherein the first terminal receives a second voltage via the second current source, and wherein the second terminal is coupled to the first terminal of the second capacitor;
   a third current source;
   a fourth switch having a first terminal, a second terminal and a control terminal, wherein the first terminal is coupled to the first terminal of the first capacitor, and wherein the second terminal is coupled to ground via the third current source;
   a third comparator having a first input terminal, a second input terminal and an output terminal, and wherein the first input terminal is coupled to the first terminal of the first capacitor, and wherein the second input terminal is configured to receive a second reference signal; and
   a second logic circuit having a first input terminal, a second input terminal, a first output terminal and a second output terminal, wherein the first input terminal is coupled to the output terminal of the third comparator, and wherein the second input terminal is configured to receive the switching signal, and wherein the second logic circuit is configured to provide a plurality of control signals to control the first switch, the second switch, the third switch and the fourth switch.

7. The control circuit according to claim 6, wherein the second logic circuit further comprise a pulse generating circuit, and wherein the pulse generating circuit is configured to generate a pulse signal the frequency of which is substantially the same as the frequency of the switching signal.

8. The control circuit of claim 6, wherein the second logic circuit is configured to provide a first control signal and a second control signal, and wherein the first control signal is configured to control the first switch and the third switch, and wherein the second control signal is configured to control the second switch and the fourth switch.

9. The control circuit according to claim 1, wherein the frequency of the switching signal is equal to the preset frequency if the OFF threshold signal is smaller than the maximum value; and wherein the frequency of the switching signal is larger than the preset frequency if the OFF threshold signal is clamped to the maximum value by the clamping circuit.

10. The control circuit according to claim 1, wherein the current sensing circuit is configured to detect the current flowing through the power switch.

11. The control circuit according to claim 1, wherein the current sensing circuit comprising a current simulating circuit configured to simulate the current flowing through the power switch by detecting a voltage difference between the first terminal of the power switch and the second terminal of the power switch.

12. The control circuit according to claim 1, wherein the current sensing circuit comprising a current simulating circuit configured to simulate the current flowing through the power switch by detecting a voltage on the second terminal of the power switch.

13. A control method for a switching converter with at least a power switch, comprising:
   generating an ON signal via an ON signal generating circuit based on a comparison result between a reference signal and a feedback signal, wherein the feedback signal indicates an output voltage or a load current of the switching converter;
   generating a current sensing signal based on a current flowing through the power switch;
   generating an OFF signal based on a comparison result between a OFF threshold signal and the current sensing signal;
   generating a switching signal based on the ON signal and the OFF signal, wherein the switching signal is configured to control the power switch; and
   adjusting the OFF threshold signal based on a difference between a frequency of the switching signal and a preset frequency, so as to make the frequency of the switching signal substantially equal or larger than the preset frequency; wherein
   the OFF threshold signal is clamped to a maximum value, the ON signal generating circuit comprises a first amplifier having a first input terminal, a second input terminal and an output terminal, and wherein the first input terminal is utilized as a first input terminal of the ON signal generating circuit, and wherein the second input terminal is utilized as a second input terminal of the ON signal generating circuit, and wherein the ON signal generating circuit further comprises a first comparator having a first input terminal, a second input terminal and an output terminal, and wherein the first input terminal is coupled to the output terminal of the first amplifier, and wherein the second input terminal is coupled to the second input terminal of the first amplifier, and wherein the output terminal is utilized as an output terminal of the ON signal generating circuit.

14. The control method according to claim 13, wherein the switching converter is configured in a BUCK converter.

15. The control method according to claim 13, wherein the frequency of the switching signal is equal to the preset frequency if the OFF threshold signal is smaller than a maximum value; and wherein the frequency of the switching signal is larger than the preset frequency if the OFF threshold signal is clamped to the maximum value.

* * * * *